United States Patent
Bajpai et al.

(10) Patent No.: US 8,538,387 B2
(45) Date of Patent: Sep. 17, 2013

(54) SINGLE VOICEMAIL FOR DUAL-MODE PHONES

(75) Inventors: Rajneesh Bajpai, San Jose, CA (US); Pradeep Iyer, Cupertino, CA (US); Venkat Kalkunte, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1237 days.

(21) Appl. No.: 11/955,091

(22) Filed: Dec. 12, 2007

(65) Prior Publication Data
US 2009/0156175 A1 Jun. 18, 2009

(51) Int. Cl.
*H04M 11/10* (2006.01)
*H04W 36/00* (2009.01)
*H04M 1/00* (2006.01)

(52) U.S. Cl.
USPC ..... 455/413; 455/444; 455/552.1; 455/553.1; 455/554.1; 455/555

(58) Field of Classification Search
USPC .......................................... 455/413, 436–448
See application file for complete search history.

(56) References Cited

U.S. PATENT DOCUMENTS

| | | | |
|---|---|---|---|
| 5,125,021 A | 6/1992 | Lebowitz | |
| 5,260,988 A | 11/1993 | Schellinger et al. | |
| 5,388,101 A | 2/1995 | Dinkins | |
| 5,592,491 A | 1/1997 | Dinkins | |
| 5,594,782 A | 1/1997 | Zicker et al. | |
| 6,445,921 B1 | 9/2002 | Bell | |
| 6,614,786 B1 | 9/2003 | Byers | |
| 6,975,602 B2 | 12/2005 | Anderson | |
| 7,035,260 B1 | 4/2006 | Betta | |
| 7,231,205 B2 | 6/2007 | Guyot et al. | |
| 7,308,263 B2 * | 12/2007 | Gallagher et al. | 455/439 |
| 7,414,992 B2 | 8/2008 | Hirsbrunner et al. | |
| 7,492,872 B1 | 2/2009 | Di Carlo et al. | |
| 7,565,145 B2 | 7/2009 | Gallagher et al. | |
| 7,606,190 B2 | 10/2009 | Markovic et al. | |
| 7,768,977 B2 | 8/2010 | Camp, Jr. | |
| 7,826,868 B2 | 11/2010 | Robbins et al. | |
| 8,000,739 B2 | 8/2011 | Bajpai et al. | |
| 8,295,878 B2 | 10/2012 | Bajpai et al. | |
| 2002/0111198 A1 | 8/2002 | Heie | |
| 2002/0132638 A1 | 9/2002 | Plahte et al. | |
| 2003/0139180 A1 | 7/2003 | McIntosh et al. | |
| 2004/0033811 A1 | 2/2004 | Tsai et al. | |

(Continued)

OTHER PUBLICATIONS

H. Schulzrinne et al., "RTP Payload for DTMF Digits, Telephony Tones and Telephony Signals", Network Working Group, May 2000, 1-30.

(Continued)

*Primary Examiner* — Huy C Ho
(74) *Attorney, Agent, or Firm* — Blakely, Sokoloff, Taylor & Zafman LLP

(57) ABSTRACT

Single voicemail for dual-mode phones. Functionality is added to a dual-mode phone such that the dual-mode phone when operating in cellular mode sends a predetermined signal when it answers an incoming call. An enterprise mobility controller, on forwarding a call to the cellular side of a dual-mode phone after failing to complete a Wi-Fi connection, starts a timer. If the mobility controller does not receive the predetermined signal before the timer expires, it assumes that the cellular call has been handed off to the cellular voicemail system, terminates the cellular call, and sends the call to the enterprise voicemail system.

11 Claims, 1 Drawing Sheet

(56) References Cited

U.S. PATENT DOCUMENTS

| | | | |
|---|---|---|---|
| 2004/0264410 A1 | 12/2004 | Sagi et al. | |
| 2006/0023658 A1* | 2/2006 | Phillips et al. | 370/328 |
| 2006/0058050 A1 | 3/2006 | Park | |
| 2006/0223555 A1 | 10/2006 | Kim | |
| 2006/0239277 A1* | 10/2006 | Gallagher | 370/401 |
| 2007/0014260 A1 | 1/2007 | Seo | |
| 2007/0149176 A1 | 6/2007 | Wells et al. | |
| 2007/0165825 A1 | 7/2007 | Ko et al. | |
| 2007/0207804 A1* | 9/2007 | Sharma et al. | 455/436 |
| 2007/0268858 A1 | 11/2007 | Soto | |
| 2007/0281682 A1 | 12/2007 | Raju et al. | |
| 2008/0002605 A1 | 1/2008 | Todd et al. | |
| 2008/0085728 A1 | 4/2008 | Reding | |
| 2008/0112392 A1 | 5/2008 | Mansfield | |
| 2008/0139228 A1 | 6/2008 | Raffel et al. | |
| 2009/0156217 A1 | 6/2009 | Bajpai | |
| 2009/0163229 A1 | 6/2009 | Bajpai et al. | |
| 2010/0105379 A1* | 4/2010 | Bonner et al. | 455/433 |

OTHER PUBLICATIONS

R. Many et al., "A Message Summary and Message Waiting Indication Event Package for the Session Initiation Protocol (SIP)", Network Working Group, Aug. 2004, 1-19.

S. Bellovin et al., "Security Mechanisms for the Internet", Network Working Group, Dec. 2003, 1-20.

H. Schulzrinne et al., "RTP: A Transport Protocol for Real-Time Applications", Network Working Group, Jul. 2003, 1-89.

J. Rosenberg et al., "SIP: Session Initiation Protocol", Network Working Group, Jun. 2002, 1-269.

United States Office Action dated Jun. 17, 2010 for U.S. Appl. No. 11/955,104, filed Dec. 12, 2007 entitled Single Number Presentation for Dual-Mode Phones.

United States Office Action dated Nov. 15, 2010 for U.S. Appl. No. 11/963,275, filed Dec. 12, 2007 entitled Indicators for Dual-Mode Phones.

United States Office Action dated Dec. 6, 2010 for U.S. Appl. No. 11/955,104, filed Dec. 12, 2007 entitled Single Number Presentation for Dual-Mode Phones.

United States Office Action dated Sep. 30, 2010 for U.S. Appl. No. 11/955,108, filed Dec. 12, 2007 entitled Delayed ACK in Dual-Mode Call Handover.

United States Office Action dated Apr. 26, 2011 for U.S. Appl. No. 11/963,275, filed Dec. 12, 2007 entitled Indicators for Dual Mode Phones.

United States Office Action dated Mar. 2, 2011 for U.S. Appl. No. 12/168,756, filed Jul. 7, 2008 entitled Enterprise Seamless Mobility.

United States Office Action dated Mar. 23, 2011 for U.S. Appl. No. 11/955,108, filed Dec. 12, 2007 entitled Delayed ACK in Dual-Mode Call Handover.

United States Office Action dated Oct. 25, 2011 for U.S. Appl. No. 11/955,108, filed Dec. 12, 2007 entitled Indicators for Dual Mode Phones.

United States Office Action dated Nov. 22, 2011 for U.S. Appl. No. 12/168,756.

United States Office Action dated Sep. 29, 2011 for U.S. Appl. No. 13/191,324, filed Jul. 26, 2011.

U.S. Appl. No. 12/168,756, Non-Final Office Action, mailed Nov. 26, 2012.

U.S. Appl. No. 11/963,275, Non-Final Office Action, mailed Mar. 22, 2012.

U.S. Appl. No. 11/963,275, Final Office Action, mailed Jul. 6, 2012.

U.S. Appl. No. 11/963,275, Non-Final Office Action, mailed Dec. 31, 2012.

U.S. Appl. No. 12/168,756, Final Office Action, mailed Jun. 12, 2013.

* cited by examiner

SINGLE VOICEMAIL FOR DUAL-MODE PHONES

CROSS REFERENCE TO RELATED APPLICATIONS

The present application is related to (1) U.S. patent application Ser. No. 11/955,104 filed Dec. 12, 2007 and entitled "Single Number Presentation for Dual-Mode Phones"; (2) U.S. patent application Ser. No. 11/963,275 filed Dec. 21, 2007 and entitled "Indicators for Dual-Mode Phones"; and (3) U.S. patent application Ser. No. 11/955,108 filed Dec. 12, 2007 and entitled "Delayed ACK in Dual-Mode Call Handover", all incorporated herein by reference.

BACKGROUND OF THE INVENTION

The present invention relates to the operation of dual-mode phones, and more particularly, to handling voicemail in dual-mode phones.

Dual-mode phones support connections via Wi-Fi and cellular networks. In an enterprise environment, calls placed to phone numbers associated with the enterprise are sent from the enterprise SIP PBX to a mobility controller. The mobility controller then attempts to forward the incoming call through the enterprise Wi-Fi network to the proper dual-mode phone. If the desired dual-mode phone is not available on the enterprise Wi-Fi network, the mobility controller establishes a call through the SIP PBX to the cellular side of the desired dual-mode phone.

A problem arises however, as the enterprise provides a voicemail system to enterprise users, but when a call is forwarded by the enterprise mobility controller to the cellular side of a dual-mode phone, the enterprise user no longer has any indication of whether or not voicemail has been left with the separate cellular network; the enterprise and cellular voicemail systems are separate.

BRIEF DESCRIPTION OF THE DRAWINGS

The invention may be best understood by referring to the following description and accompanying drawings that are used to illustrate embodiments of the invention in which.

DETAILED DESCRIPTION

Figure 1:
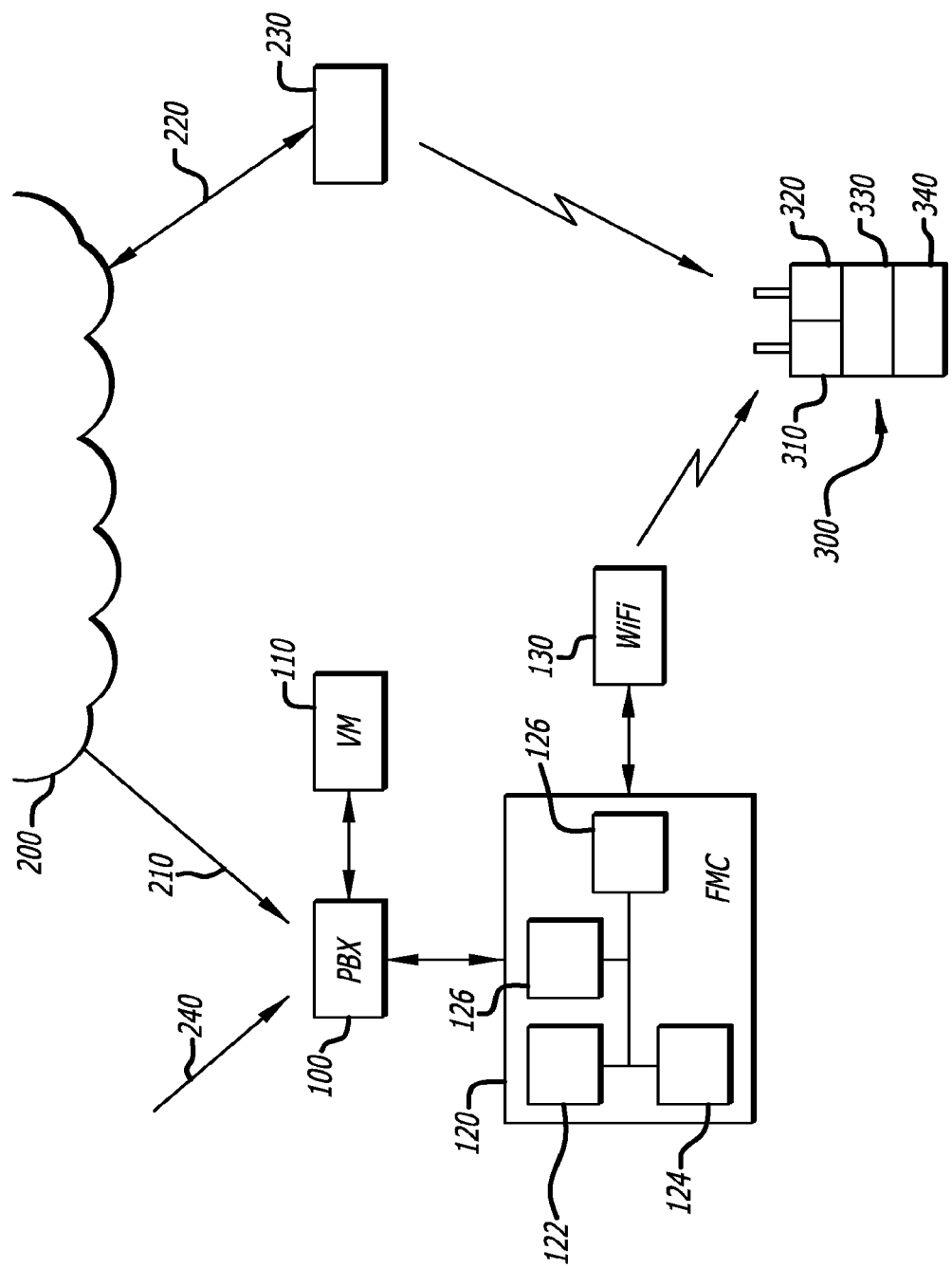
FIG. 1 shows a dual-mode phone in a network.

Embodiments of the invention relate to dual-mode phones, and to redirecting voicemail in systems employing dual-mode phones. In an embodiment of the invention, a dual-mode phone when operating in its cellular mode sends out a predetermined signal, such as a predetermined set of DTMF tones, when the operator of the dual-mode phone answers a call. An enterprise mobility controller working through an enterprise SIP PBX uses this predetermined signal, and its absence, to detect when a call forwarded from the enterprise to the cellular side of a dual-mode phone has be en transferred to cellular voicemail. When a transfer to the cellular voicemail system is detected, the mobility controller breaks the cellular call and reroutes the call to the enterprise voicemail system.

FIG. 1. shows an embodiment of the invention including a dual-mode phone Enterprise SIP PBX communicates 210 with public switched telephone network (PSTN) 200. SIP PBX 100 also supports voicemail system 110. SIP PBX 100 also communicates with fixed mobility controller (FMC) 120. Mobility controller 120 bridges the worlds of SIP PBX 100 and Wi-Fi network controller 130. SIP PBX 100 and fixed mobility controller 120 communicate for example using protocols established by RFC 3261, RFC 2833, and RFC 3631, incorporated herein by reference. Voice streams are typically encoded using the RTP protocols defined by RFC 3550, incorporated herein by reference.

As understood in the art, such a hardware platform as shown in FIG. 1 for hosting mobility controller 120 includes a central processing unit (CPU) 122 connected to memory hierarchy 124, and to one or more interfaces 126. In one embodiment, CPU 122 is a MIPS-style CPU such as those from Raza Microelectronics or Cavium Networks, although CPUs from other companies such as Intel, AMD, Freescale, or the like may also be used. Memory hierarchy 124 includes read-only memory for system initialization, high-speed read-write memory such as DRAM, and bulk memory such as a hard disk or compact flash storage for files. Interfaces 126 include wired and wireless Ethernet interfaces as are known to the art. Controller 120 typically operates under the control of an operating system such as Linux, hosting software processes which provide device functionality. Additional hardware may be provided to provide for high-speed packet handling, crypto processing, and the like. While FIG. 1 shows mobility controller 120 and Wi-Fi-network controller 130 as separate entities, it should be noted that they may also be software processes running on a shared hardware platform. As an example, a single hardware platform based on a multi-core MIPS processor such as those from Raza Microelectronics or Cavium Netorks could host the functions of Wi-Fi network controller 130 along with mobility controller 120 and additional functions such as intrusion detection and/or firewalls.

Dual-mode phone 300 has first radio subsystem 310 for Wi-Fi communications such as to Wi-Fi network controller 130. Dual-mode phone 300 also has second radio subsystem 320 for communicating with cellular network 230 and through public switched telephone network 200. As is common with many such devices, dual-mode phone 300 is a digital device operating under control of CPU 330 through programs and data stored in memory hierarchy 340. Other aspects of dual-mode phone 300 such as speakers, microphones, power and display, keyboards and the like are understood by those in the art, and are not shown.

In operation, PSTN call 240 arrives at enterprise PBX 100. If PBX 100 determines that the requested destination is busy, it routes the call to enterprise voicemail system 110. If PBX 100 determines that the destination is not busy and is owned by mobility controller 120, it routes the call to mobility controller 120. If dual-mode phone 300 is within range of Wi-Fi network controller 130, the call is routed through mobility controller 120 and Wi-Fi network 130 to the Wi-Fi side 310 of dual-mode phone 300.

If dual-mode phone 300 is not within range of Wi-Fi network controller 130, mobility controller 120 initiates a PSTN call through PBX 100, PSTN 200, and cellular network 230 to pass the call to the cellular side 320 of dual-mode phone 300.

While mobility controller 120 receives a SIP indication ("200 OK") when the cellular call has gone through, it cannot tell if this is due to the user answering the call, or the cellular voicemail system answering the call.

In accordance with an embodiment of the present invention, dual-mode phone 300 is modified so that it transmits a predetermined signal when the user answers a cell call. This signal may be, for example, a predetermined touchtone pattern, such as "#*#" or some other predetermined signal. When controller 120 initiates the PSTN connection with the cellular side 320 of dual-mode phone 300, it negotiates call parameters including packetized DTMF tones according to RFC 2833.

When controller 120 receives the SIP indication that the cellular call has gone through, it starts a timer for a predetermined time, as an example five seconds.

If controller 120 receives the predetermined signal before the timer expires, it knows that the user has answered the call, and routes call 240 through to the cellular call just established.

If controller 120 does not receive the predetermined signal before the timer expires, it knows that the call has been picked up by the cellular voicemail system. It terminates the cellular call, and instructs PBX 100 to route the call to enterprise voicemail system 110.

In a second embodiment of the invention, this notification and detection logic is inverted. In this embodiment, the cellular voicemail system is programmed to produce a predetermined signal when it answers calls. When mobility controller 120 receives this predetermined signal, it knows that the cellular voicemail system has picked up the call, and can terminate the cellular call and reroute the call to enterprise voicemail system 110.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method of operating a controller for controlling a dual-mode phone comprising:
    receiving an incoming outside call for a target number at the controller,
    retrieving a cellular number for the dual-mode phone associated with the target number, the cellular number being different than the target number,
    placing a cellular call to the cellular number by the controller,
    starting a timer when the cellular call is answered,
    determining if a cellular voicemail answered the cellular call according to receipt of an in-band predetermined signal sent via the cellular call before a preset time on the timer expires,
    connecting the incoming outside call to the cellular call if the cellular voicemail did not answer the cellular call, and
    disconnecting the cellular call and connecting the incoming outside call to voicemail associated with the target number if the cellular voicemail answered the cellular call.

2. The method of claim 1 where the step of receiving the incoming outside call for the target number further comprises:
    receiving the incoming outside call for the target number by a PBX, and
    passing the incoming outside call for the target number through the PBX to the controller.

3. The method of claim 1 where the step of placing cellular call to the cellular number by the controller further comprises:
    the controller directing the PBX to place the cellular call to the cellular number.

4. The method of claim 1 wherein the predetermined signal is a predetermined set of DTMF tones.

5. The method of claim 1 wherein the predetermined signal is a predetermined touchtone pattern.

6. A method of operating a controller for controlling a dual-mode phone comprising:
    receiving an incoming outside call for a target number by a PBX,
    passing the incoming outside call for the target number through the PBX to the controller,
    if the controller determines that the dual-mode phone associated with the target number is within range of an enterprise network, connecting the incoming call to the dual-mode phone through the enterprise network,
    if the controller determines that the dual-mode phone associated with the target number is not within range of the enterprise network:
        retrieving a cellular number for the dual-mode phone associated with the target number, the cellular number being different than the target number,
        directing the PBX to place a cellular call to the cellular number,
        starting a timer when the cellular call is answered,
        determining if an in-band predetermined signal was received via the cellular call before a preset time on the timer expired, the predetermined signal being sent when a user answers the cellular call,
        connecting the incoming outside call to the cellular call if the in-band predetermined signal was received, and
        disconnecting the cellular call and connecting the incoming outside call to voicemail associated with the target number if the in-band predetermined signal was not received.

7. The method of claim 6 wherein the predetermined signal is a predetermined set of DTMF tones.

8. The method of claim 6 wherein the predetermined signal is a predetermined touchtone pattern.

9. A method of operating a controller for controlling dual-mode phones comprising:
    receiving an incoming outside call for a target number by a PBX,
    passing the incoming outside call for the target number through the PBX to the controller,
    if the controller determines that the dual-mode phone associated with the target number is within range of an enterprise network, connecting the incoming call to the dual-mode phone through the enterprise network,
    if the controller determines that the dual-mode phone associated with the target number is not within range of the enterprise network:
        retrieving a cellular number for the dual-mode phone associated with the target number, the cellular number being different than the target number,
        directing the PBX to place a cellular call to the cellular number,
        starting a timer when the cellular call is answered,
        determining if an in-band predetermined signal was received via the cellular call before a preset time on the timer expired, the predetermined signal being sent when a cellular voicemail answers the cellular call,
        connecting the incoming outside call to the cellular call if the in-band predetermined signal was not received, and
        disconnecting the cellular call and connecting the incoming outside call to voicemail associated with the target number if the in-band predetermined signal was received.

10. The method of claim 9 wherein the predetermined signal is a predetermined set of DTMF tones.

11. The method of claim 9 wherein the predetermined signal is a predetermined touchtone pattern.

* * * * *